US011669867B2

United States Patent
Lee et al.

(10) Patent No.: US 11,669,867 B2
(45) Date of Patent: Jun. 6, 2023

(54) MOBILE TERMINAL AND METHOD OF MANAGING APPLICATION THEREOF, AND SYSTEM FOR PROVIDING TARGET ADVERTISEMENT USING THE SAME

(71) Applicant: NHN Corporation, Seongnam-si (KR)

(72) Inventors: Daebeom Lee, Seongnam-si (KR);
Joon Sung Park, Seongnam-si (KR);
Joon Ho Lee, Seongnam-si (KR);
Donghun Kwon, Seongnam-si (KR);
Jun Sung Kim, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 0 days.

(21) Appl. No.: 16/245,842

(22) Filed: Jan. 11, 2019

(65) Prior Publication Data
US 2019/0220901 A1    Jul. 18, 2019

(30) Foreign Application Priority Data
Jan. 12, 2018   (KR) .......................... 10-2018-0004319

(51) Int. Cl.
*G06Q 30/0251*   (2023.01)
*H04W 4/23*   (2018.01)
(Continued)

(52) U.S. Cl.
CPC ....... *G06Q 30/0269* (2013.01); *H04L 67/535* (2022.05); *H04L 67/568* (2022.05); *H04W 4/23* (2018.02)

(58) Field of Classification Search
CPC . H04L 67/22; H04L 67/2842; G06Q 30/0269; H04W 4/23
See application file for complete search history.

(56) References Cited

U.S. PATENT DOCUMENTS

| 5,713,008 A * | 1/1998 | Falkner ............... G06F 11/3476 711/118 |
| 5,862,409 A * | 1/1999 | Yoshimoto ................ G06F 5/10 710/57 |

(Continued)

FOREIGN PATENT DOCUMENTS

| CN | 103971265 | 8/2014 |
| JP | 2016524227 | 8/2016 |

(Continued)

OTHER PUBLICATIONS

Japanese Office Action dated Jan. 24, 2023, in Japanese Patent Application No. 2019-001610 (with machine translation).

*Primary Examiner* — Chris Parry
*Assistant Examiner* — Steven C Nguyen
(74) *Attorney, Agent, or Firm* — H.C. Park & Associates, PLC (57) ABSTRACT

A mobile terminal including: a memory having a plurality of applications stored therein; an application management module configured to receive application information corresponding to the respective applications, and generate status information of the applications, corresponding to the application information; and a controller configured to determine execution history information of the applications through the status information provided from the application management module, wherein the application management module includes: an application information collection unit configured to collect cache data size information of the respective applications at preset time intervals; and a comparison unit configured to generate the status information of the applications by comparing the cache data size information of the applications, collected by the application information collection unit, to reference values corresponding to the respective applications.

6 Claims, 5 Drawing Sheets

(51) Int. Cl.
*H04L 67/50* (2022.01)
*H04L 67/568* (2022.01)

(56) References Cited

U.S. PATENT DOCUMENTS

| | | | |
|---|---|---|---|
| 9,460,461 B1 | 10/2016 | Gill et al. | |
| 2004/0143707 A1* | 7/2004 | Olarig | G06F 12/084 |
| | | | 711/129 |
| 2005/0005242 A1* | 1/2005 | Hoyle | G06F 9/30 |
| | | | 715/745 |
| 2005/0172079 A1* | 8/2005 | McFarling | G06F 12/0802 |
| | | | 711/133 |
| 2009/0125465 A1* | 5/2009 | Berg | G06F 11/3616 |
| | | | 706/17 |
| 2012/0310739 A1 | 12/2012 | Watfa et al. | |
| 2013/0179490 A1* | 7/2013 | Naga | G06F 16/172 |
| | | | 709/203 |
| 2014/0161083 A1* | 6/2014 | Nobukiyo | H04W 72/042 |
| | | | 370/329 |
| 2014/0214537 A1 | 7/2014 | Yoo et al. | |
| 2015/0133076 A1* | 5/2015 | Brough | G06F 11/302 |
| | | | 455/405 |
| 2015/0180804 A1* | 6/2015 | Kim | H04L 49/9005 |
| | | | 370/412 |
| 2015/0256639 A1* | 9/2015 | Chow | H04L 67/2842 |
| | | | 709/213 |
| 2016/0063850 A1* | 3/2016 | Yang | G08B 23/00 |
| | | | 340/539.22 |
| 2016/0127511 A1 | 5/2016 | Zhang et al. | |
| 2016/0285963 A1 | 9/2016 | Kaminosono et al. | |
| 2016/0335191 A1* | 11/2016 | Dong | G06F 16/9574 |
| 2019/0342942 A1* | 11/2019 | Deros | H04W 4/021 |

FOREIGN PATENT DOCUMENTS

| | | |
|---|---|---|
| JP | 2016181154 | 10/2016 |
| KR | 10-2014-0146939 | 12/2014 |
| KR | 10-2015-0059204 | 6/2015 |
| KR | 10-2015-0105591 | 9/2015 |
| KR | 10-2016-0105274 | 9/2016 |

\* cited by examiner

MOBILE TERMINAL AND METHOD OF MANAGING APPLICATION THEREOF, AND SYSTEM FOR PROVIDING TARGET ADVERTISEMENT USING THE SAME

CROSS REFERENCE TO RELATED APPLICATION

This application claims priority from and the benefit of Korean Patent Application No. 10-2018-0004319, filed on Jan. 12, 2018, which is hereby incorporated by reference for all purposes as if fully set forth herein.

BACKGROUND

Field

Exemplary implementations of the invention relate to a mobile terminal and a method of managing an application thereof, and more particularly, to a mobile terminal and a method of managing an application thereof by checking and managing execution histories of applications installed therein, and a system for providing target advertisement using the same.

Discussion of the Background

Recently, with the rapid advancement in computers, electronics, and communication technologies, a variety of wireless communication services using a wireless network have been provided. Mobile terminals providing various convenience functions through the wireless communication services have become necessary belongings for users. Such convenience functions are implemented through applications installed in a mobile terminal by a user.

In general, an application refers a content application program such as schedule management, address book, game, video or music play, and a user may download an application through an online application store or the like, and install the application in a mobile terminal of the user.

Recently, with the advancement in communication networks, advertisements based on mobile terminals have become widely used. However, due to the increase of advertisement media, users are extensively exposed to advertisements such that they are not interested, and thus tend to be indifferent to the advertisements. Thus, advertisers inevitably obtain low advertisement effects, compared to advertisement expenses that the advertisers pay.

Therefore, there is a demand for a method capable of providing the optimal advertisement which coincides with a matter of interest for each user.

The above information disclosed in this Background section is only for understanding of the background of the inventive concepts, and, therefore, it may contain information that does not constitute prior art.

SUMMARY

Devices and methods according to exemplary implementations of the invention are directed to a mobile terminal which can determine execution history information of applications used by a user among applications installed therein and manage the applications using the execution history information, and a method of managing an application thereof.

Also, devices and methods according to exemplary implementations of the invention are directed to a system for providing a target advertisement which decides target advertisement contents suitable for the user of each mobile terminal based on application execution history information managed by the mobile terminal, and transmits the target advertisement contents to the mobile terminal.

Additional features of the inventive concepts will be set forth in the description which follows, and in part will be apparent from the description, or may be learned by practice of the inventive concepts.

According to one or more embodiments of the invention, a mobile terminal includes: a memory having a plurality of applications stored therein; an application management module configured to receive application information corresponding to the respective applications, and generate status information of the applications, corresponding to the application information; and a controller configured to determine execution history information of the applications through the status information provided from the application management module, wherein the application management module includes: an application information collection unit configured to collect cache data size information of the respective applications at preset time intervals; and a comparison unit configured to generate the status information of the applications by comparing the cache data size information of the applications, collected by the application information collection unit, to reference values corresponding to the respective applications.

The mobile terminal may further include a communication module configured to transmit the status information or the execution history information of the applications to an external server through a network under control of the controller.

The mobile terminal may further include a display module configured to display a result to a user, the result being sensed by the controller based on the status information or the execution history information of the applications.

The mobile terminal may further include an audio output module configured to output a result sensed by the controller based on the status information or the execution history information of the applications as an audio signal to a user.

The reference values corresponding to the respective applications may indicate accumulated cache data size information of the respective applications before the cache data size information are collected by the application information collection unit.

According to one or more embodiments of the invention, an application management method for managing an application of a mobile terminal includes: receiving application information corresponding to a plurality of applications stored in a memory; generating status information corresponding to the respective applications by comparing the received application information to reference values of the respective applications; determining executions history information of the respective applications based on the status information; and storing the execution history information of the respective applications and the status information corresponding to the respective applications.

The status information corresponding to the respective applications may include cache data size information of the respective applications.

The reference values corresponding to the respective applications may indicate accumulated cache data size information of the respective applications before receiving application cache data.

The application management method may further include transmitting the status information or the execution history information of the applications to an external server through a network.

The application management method may further include displaying a sensing result to a user, the sensing result being generated based on the status information or the execution history information of the applications.

The application management method may further include outputting a sensing result as an audio signal to a user, the sensing result being generated based on the status information or the execution history information of the applications.

According to one or more embodiments of the invention, a target advertisement providing system for providing target advertisement includes: a mobile terminal having a plurality of applications installed therein; a network configured to provide a wireless communication environment to the mobile terminal; and a target advertisement providing server configured to receive status information or execution history information of the applications, transmitted from the mobile terminal, while communicating with the mobile terminal through the network, select a content of the target advertisement based on the status information or the execution history information, and transmit the selected content of the target advertisement to the mobile terminal.

The mobile terminal may include: a memory having the plurality of applications stored therein; an application management module including an application information collection unit configured to collect cache data size information of the respective applications at preset time intervals; and a comparison unit configured to generate the status information of the applications by comparing the cache data size information of the applications, collected by the application information collection unit, to reference values corresponding to the respective applications; and a controller configured to determine the execution history information of the applications based on the status information provided from the application management module.

The reference values corresponding to the applications may indicate accumulated cache data size information of the respective applications before the cache data size information are collected by the application information collection unit.

The target advertisement providing server may include a memory, a database, a processor, a communication module, and an input/output interface, and the database may be configured to store and retain content which is provided by the target advertisement providing server and classified by field.

The processor may include: a data collection unit configured to collect the execution history information of the applications, transmitted from the mobile terminal; a data processing unit configured to analyze and process a user's tendency based on the execution history information of the mobile terminal; an advertisement contents selection unit configured to select content of the target advertisement suitable for a user's field of interest among the content stored/retained in the database in response to the analysis result of the data processing unit; and an advertisement contents providing unit configured to transmit the selected content of the target advertisement to the mobile terminal.

In accordance with the exemplary embodiments of the present invention, it is possible to determine execution history information of applications used by a user among applications installed in a mobile terminal of the user, and manage the applications using the execution history information.

Furthermore, it is possible to implement various convenience functions such as a function of providing target advertisement contents to the user of the mobile terminal, based on the application execution history information managed by the mobile terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

For example, blocks of the accompanying block diagrams can be executed by computer program instructions (execution engine), and the computer program instructions can be mounted in a processor of a general-use computer, special-use computer or other programmable data processing equipment. Thus, the instructions executed through the processor of the computer or other programmable data processing equipment generate units for performing functions described in the respective blocks of the block diagrams.

The computer program instructions can be stored in a computer usable or readable memory aimed at the computer or other programmable data processing equipment, in order to implement the functions through a specific method. Thus, the instructions stored in the computer usable or readable memory can be used to produce items including instruction units for performing the functions described in the respective blocks of the block diagrams.

Furthermore, computer program instructions can be mounted on the computer or other programmable data processing equipment. Therefore, instructions which generate processes executed by a computer through a series of operation steps on the computer or other programmable data processing equipment and operate the computer or other programmable data processing equipment can provide functions for executing the functions described in the respective blocks of the block diagrams.

In addition, each of the blocks may indicate a part of a module, segment or code including one or more executable instructions for executing specific logical functions. In some substitutions, the functions described in the blocks or steps can be performed out of sequence.

That is, two blocks illustrated herein can be operated substantially at the same time, and operated in the reverse sequence of the corresponding functions, if necessary.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereafter, exemplary embodiments of the present invention will be described in detail with reference to the accompanying drawings.

Figure 1:
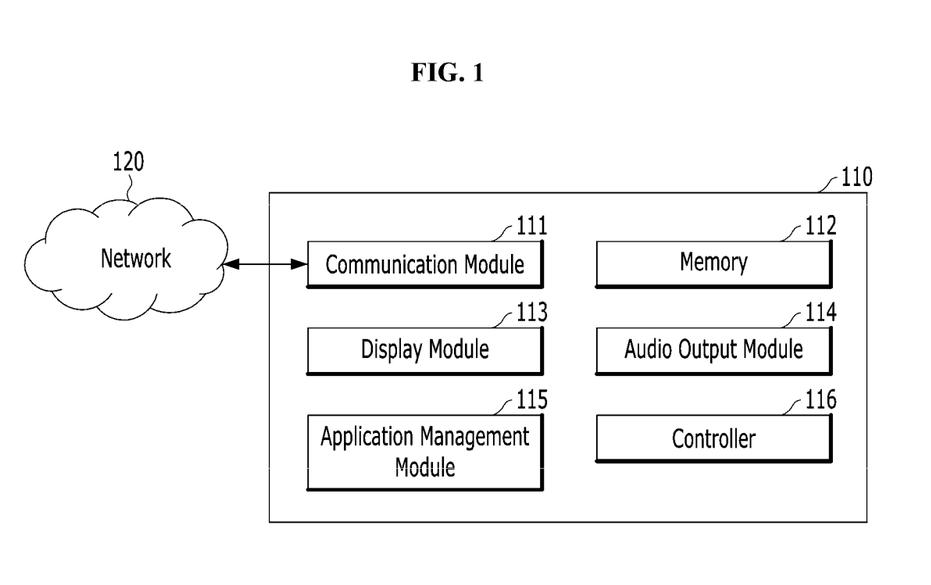
FIG. 1 is a block diagram schematically illustrating an internal configuration of a mobile terminal in accordance with an exemplary embodiment.
Figure 2:
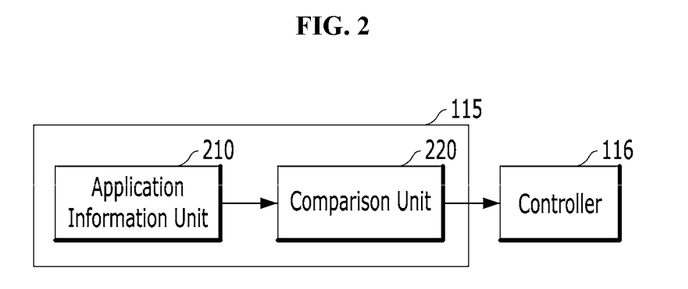
FIG. 2 is a block diagram schematically illustrating an application management module of FIG. 1.
Figure 3:
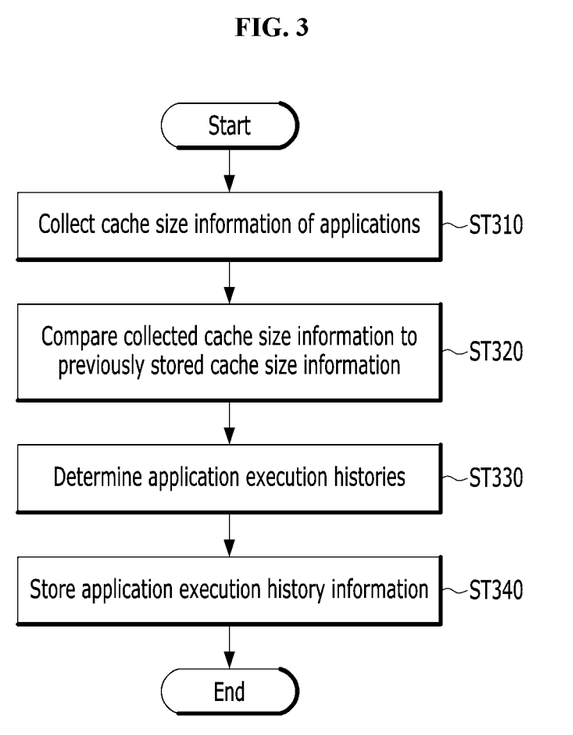
FIG. 3 is a flowchart illustrating a method of managing an application in accordance with an exemplary embodiment.

FIG. 1 is a block diagram schematically illustrating an internal configuration of a mobile terminal in accordance with an exemplary embodiment, and FIG. 2 is a block diagram schematically illustrating an application management module of FIG. 1. In addition, FIG. 3 is a flowchart illustrating a method of managing an application in accordance with an exemplary embodiment.

Referring to FIG. 1, the mobile terminal 110 may include a communication module 111, a memory 112, a display module 113, an audio output module 114, an application management module 115 and a controller 116.

The communication module 111 may be connected to an arbitrary internal component or one or more arbitrary external devices through a network 120. At this time, the one or more arbitrary external devices may include a target advertisement providing server 130 illustrated in FIG. 4. Here, examples of the wireless Internet technology may include Wireless LAN (WLAN), Digital Living Network Alliance (DLNA), Wireless Broadband (Wibro), World Interoperability for Microwave Access (Wimax), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), and the like, and the communication module 111 transmits/receives data according to one or more of the wireless internet technologies in a range including even Internet technologies which are not listed in the above-described examples. Furthermore, examples of the short range communication technology may include Bluetooth, Radio Frequency Identification (RFID), Infrared Data Association (IrDA), Ultra Wideband (UWB), ZigBee, Near Field Communication (NFC), Ultra Sound Communication (USC), Visible Light Communication (VLC), Wireless Fidelity (Wi-Fi), Wi-Fi Direct, and the like.

The communication module 111 may transmit/receive wireless signals to/from a base station on a mobile communication network which is constructed according to technology standards or communication methods for mobile communication, for example, Global System for Mobile communication (GSM), Code Division Multi Access (CDMA), Code Division Multi Access 2000 (CDMA2000), Enhanced Voice-Data Optimized (EV-DO) or Enhanced Voice-Data Only, Wideband CDMA (WCDMA), High Speed Downlink Packet Access (HSDPA), High Speed Uplink Packet Access (HSUPA), Long Term Evolution (LTE), Long Term Evolution-Advanced (LTEA), and the like.

The memory 112 stores various user interfaces (UI), graphic user interfaces (GUI) and the like. Also, the memory 112 stores data and programs required for operating the mobile terminal 110. That is, the memory 112 may store a plurality of application programs driven by the mobile terminal 110 and data and commands required for an operation of the mobile terminal 110. Hereafter, the application programs will be referred to as 'applications'. At least some of the applications may be downloaded from an external server through wireless communication. The applications may be implemented as an Automatic Speech Recognition (ASR) application, conversation application, map application, media application (for example, QuickTime, MobileMusic.app, or MobileVideo.app), social networking application (for example, Facebook or Twitter), Internet browsing application and the like. Furthermore, the applications may include one or more applications to perform a communication operation. For example, the applications may be considered as a message application, mail program, voice mail program, instant messaging application (for example, chatting), video conferencing application, fax application, or one or more combinations thereof. The applications may be stored in the memory 112, installed in the mobile terminal 110, and driven to perform an operation (or function) of the mobile terminal 110 under control of the controller 116. The memory 112 may include one or more storage media of a flash memory-type memory, hard disk-type memory, multimedia card micro-type memory, cart-type memory (for example, Secure Digital (SD) card or Extreme Digital (XD) memory), magnetic memory, magnetic disk, optical disk, Random Access Memory (RAM), Static Random Access Memory (SRAM), Read-Only Memory (ROM), Electrically Erasable Programmable Read-Only Memory (EEPROM), and Programmable Read-Only Memory (PROM). The mobile terminal 110 may operate a web storage to perform a storage function of the memory 112 on the Internet, or operate in relation to the web storage.

The communication module 111 may transmit information on the applications to the target advertisement providing server 130 through the network 120, under control of the controller 116. For example, the application information may include status information or execution history information of the applications, which is generated by the application management module 115. Thus, the target advertisement providing server 130 may decide target advertisement contents suitable for a user of the mobile terminal based on the application execution history information managed by the mobile terminal 110, and transmit the target advertisement contents to the mobile terminal.

The memory 112 may store the above-described execution history information of the applications installed in the mobile terminal 110, under control of the controller 116.

The display module 113 may display various contents such as various menu screens using a user interface and/or graphic user interface stored in the memory 112 under control of the controller 116, and display an application execution result screen which is executed under control of the controller 116. The contents displayed on the display module 113 include various texts or image data (including various information data) and a menu screen including data such as icons, list menus and combo boxes. The display module 113 may be implemented as an Liquid Crystal Display (LCD), Organic Light-Emitting Diode (OLED), flexible display, 3D display, e-ink display, Light Emitting Diode (LED), or the like.

The audio output module 114 may output voice information included in a signal obtained by processing a predetermined signal under control of the controller 116. The audio output module 114 may include a receiver, speaker, buzzer and the like. Furthermore, the audio output module 114 may output guide information corresponding to an application execution result screen executed by control of the controller 116.

The application management module 115 performs an operation of receiving the information of the plurality of applications stored in the memory 112 and generating the corresponding status information of the applications. More specifically, the application management module 115, which performs a function of checking whether the plurality of applications installed in the mobile terminal 110 are actually executed, may be downloaded from an external server through wireless communication, stored in the memory 112, installed in the mobile terminal 110, and driven to perform a management operation (function) for the applications under control of the controller 116. In other words, the application management module 115 collects the information of the applications mounted in the mobile terminal 110, and generates information for checking which one of the applications is actually used. For example, the information of the applications may be cache data size information of the respective applications. The size may indicate a data size which is generally based on bit. The application management module 115 may generate the status information on the plurality of applications installed in the mobile terminal 110, i.e. the execution history information of the applications, by comparing the collected cache data size information of the applications to reference values corresponding to the respective applications.

In other words, when an application is executed, an image including a video may be changed or various scripts may be newly called, and the automatically stored cache data of the application is also inevitably changed in order to implement such a function. Thus, the application management module 115 may determine which applications are actually used by the user, by checking whether the cache data size of the application is changed. That is, the status information of the applications, generated through the application management module 115, may be used as the execution history information on the plurality of applications installed in the mobile terminal 110.

Referring to FIGS. 2 and 3, the configuration of the application management module 115 and the method of managing the application in accordance with the exemplary embodiment will be described as follows.

The application management module 115 may include an application information collection unit 210 and a comparison unit 220.

The application information collection unit 210 collects the cache data sizes of the plurality of applications installed in the mobile terminal 110 at preset time intervals at step ST310. At this time, the time intervals may be set to 24 hours, for example. However, this is only an exemplary embodiment, and the present invention is not limited thereto. That is, the user may control the time intervals through the controller 116.

The comparison unit 220 generates the status information corresponding to the applications by comparing the cache data size information of the applications, collected by the application information collection unit 210, to the reference values corresponding to the respective applications, at step ST320. For example, the comparison unit 220 may compare the cache data sizes of the respective applications, which have been finally accumulated before, to the cache data sizes of the respective applications, which are collected by the application is information collection unit 210, in order to determine the changes of the cache data sizes. That is, the cache data sizes of the respective applications, which have been finally accumulated before, may be set to the reference values. Furthermore, when the comparison by the comparison unit 220 is completed, the cache data sizes of the applications, collected by the application information collection unit 210, may be updated into the accumulated cache data sizes of the applications.

The status information of the respective applications, generated by the application management module 115, may be transmitted to the controller 116, and used as information for determining the execution history information of the plurality of applications installed in the mobile terminal 110, at step ST330.

The updated information and the execution history information of the respective applications, obtained through the comparison unit 220, may be stored in the memory 112 at step ST340.

The controller 116 may sense whether the cache is excessively used for a specific application, through the execution history information on the applications. The application which excessively uses the cache may have a bad influence on the performance of the mobile terminal 110. Therefore, when sensing the application which excessively uses the cache, the controller 116 may warn the user about this situation through the display module 113 and/or the audio output module 114, and the user may remove the corresponding application.

Through the execution history information on the applications, the controller 116 may sense whether an application is automatically executed and continuously operated as a background application, even though the application was not actually executed by the user. In this case, the controller 116 may warn the user about the sensing result through the display module 113 and/or the audio output module 114, and the user may remove the corresponding application.

Through the history execution information on the applications, the controller 116 may sense which applications are not frequently used by the user. In this case, the controller 116 may warn the user about the sensing result through the display module 113 and/or the audio output module 114, and the user may remove the corresponding application.

The controller 116 executes overall control functions of the mobile terminal 110. Furthermore, the controller 116 executes overall control functions of the mobile terminal 110 using programs and data stored in the memory 112. The controller 116 may include a RAM, ROM, CPU, GPU, and bus, and the RAM, ROM, CPU, and GPU may be connected to one another through the bus. The CPU may access the memory 112 to perform booting using an O/S stored in the memory 112, and perform various operations using various programs, contents, data and the like, which are stored in the memory 112. The controller 116 may execute the application management module 115 to perform a management operation (function) on the applications. That is, as described above, the application management module 115 may be enabled by the controller 116, compare the cache data size information of the applications to the reference values corresponding to the respective applications, and use the comparison results as the execution history information on the applications installed in the mobile terminal 110.

The mobile terminal 110 may further include an interface module (not illustrated) serving as an interface with all external devices connected to the mobile terminal 110. For example, the interface module may include a wired/wireless headset port, an external charger port, a wired/wireless data port, a memory card port, an audio I/O (Input/Output) port, a video I/O port, an earphone port, and the like.

The mobile terminal 110 may further include an input module (not illustrated) which receives a signal according to a button manipulation or arbitrary function selection by the user, and receives a command or control signal generated by a manipulation of touching/scrolling a displayed screen. The input module may include a plurality of input keys and function keys for receiving number or character information and setting various functions, as a unit for receiving one or more of a command, selection, data and information of the user. The input module may include various devices such as a key pad, dome switch, touch pad (static pressure/capacitive), touch screen, jog wheel, jog switch, jot shuttle, mouse, stylus pen and touch pen. In particular, when the display module 113 is configured in the form of a touch screen, all or part of the input functions may be executed through the display module 113. The components or modules of the mobile terminal 110 may be configured as software stored in the memory 112 of the mobile terminal 110, and include a command set which controls the mobile terminal 110 to perform a specific operation, during execution.

Figure 4:
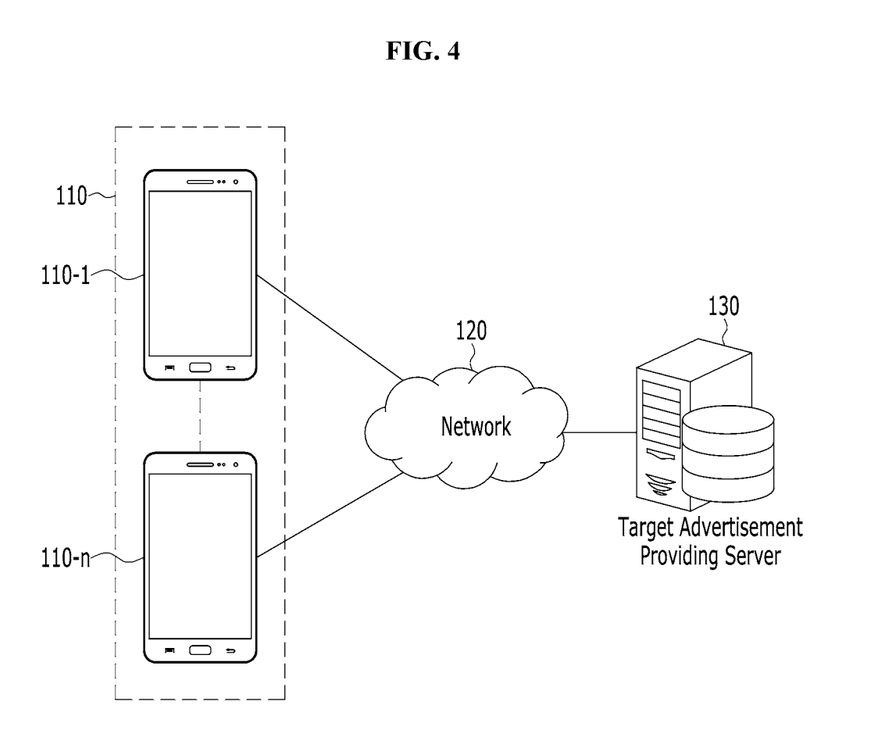
FIG. 4 is a block diagram illustrating a system for providing target advertisement using the mobile terminal of FIG. 1.

FIG. 4 is a block diagram illustrating a system for providing target advertisement using the mobile terminal of FIG. 1.

Referring to FIG. 4, a network environment in accordance with the exemplary embodiment includes a plurality of mobile terminals 110_1 to 110_n, a network 120 and a target advertisement providing server 130.

The mobile terminals 110_1 to 110_n and the network 120 may be configured in the same manner as those described above with reference to FIGS. 1, 2, and 3.

The target advertisement providing server 130 may serve to provide target advertisement contents while communicating with the mobile terminal 110 through the network 120, and include one or more server devices to provide commands, codes, files, contents, services and the like. That is, the target advertisement providing server 130 may decide target advertisement contents suitable for users of the respective mobile terminals 110_1 to 110_n based on application execution history information on applications which are actually used by the users, and transmit the target advertisement contents to the corresponding mobile terminals.

Figure 5:
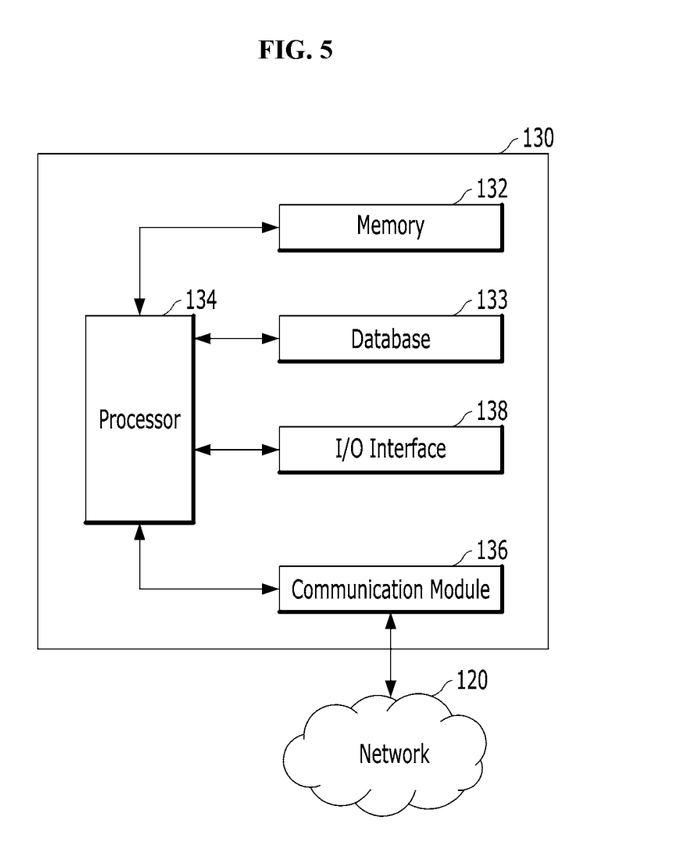
FIG. 5 is a block diagram schematically illustrating an internal configuration of the target advertisement providing server of FIG. 4.

FIG. 5 is a block diagram schematically illustrating an internal configuration of the target advertisement providing server of FIG. 4.

Referring to FIG. 5, the target advertisement providing server 130 includes a memory 132, a database 133, a processor 134, a communication module 136 and an input/output (I/O) interface 138.

The memory 132, which is a computer-readable recording medium, may include a permanent mass storage device such as a Random Access Memory (RAM), Read Only Memory (ROM), or disk drive. Furthermore, the memory 132 may store an O/S and one or more program codes. Such software components may be loaded from a computer-readable recording medium separate from the memory 132 through a drive mechanism. Such a separate computer-readable recording medium may include recording media such as a floppy drive, disk, tape, DVD/CD-ROM drive, and memory card. The software components may also be loaded to the memory 132 through the communication module 136.

The database 133 may store and retain advertisement contents which can be provided by the target advertisement providing server 130 in accordance with the exemplary embodiment. The advertisement contents may be classified by field, and stored and retained in the database 133. For example, the advertisement contents may be classified into fashion, shopping, books, travel, food life, home appliance/furniture, and regional characteristics.

The processor 134 may be configured to process a command of a computer program by executing a basic arithmetic, logic or I/O operation. The command may be provided to the processor 134 by the memory 132 or the communication module 136. For example, the processor 134 may be configured to execute a command which is received according to a program code stored in a storage device such as the memory 132.

The communication module 136 may provide a function for communication between the mobile terminal 110 and the target advertisement providing server 130 through the network 120. For example, a control signal, command, contents, file, and the like, which are provided under control of the processor 134 of the server 130, may be transmitted to the mobile terminal 110 through the communication module 136 via the network 120.

The I/O interface 138 may serve as an interface between an input device such as a keyboard or mouse and an output device such as a display.

The target advertisement providing server 130 in accordance with the exemplary embodiment analyzes user behavior information based on the execution history information of the applications transmitted from the mobile terminal 110, selects target advertisement contents suitable for the user's field of interest in response to the analysis result, and transmits the selected target advertisement contents to the mobile terminal 110. That is, the target advertisement providing server 130 may check an application which has been recently used by the mobile terminal 110, through the execution history information of the applications. In this case, the target advertisement providing server 130 may select advertisement contents related to the recently used application as the target advertisement contents, and provide the selected advertisement contents.

Figure 6:
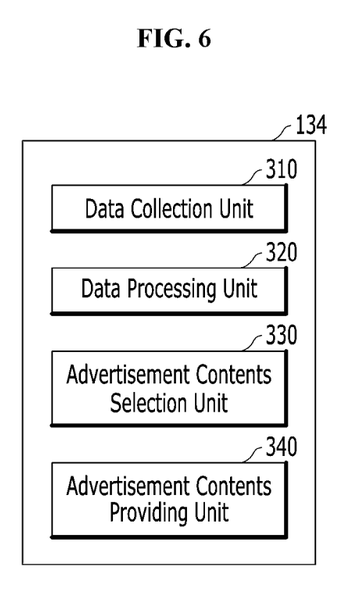
FIG. 6 is a block diagram schematically illustrating an internal configuration of a processor included in the target advertisement providing server of FIG. 5.

FIG. 6 is a block diagram schematically illustrating an internal configuration of the processor included in the target advertisement providing server of FIG. 5.

Referring to FIG. 6, the processor 134 of the target advertisement providing server 130 may include a data collection unit 310, a data processing unit 320, an advertisement contents selection unit 330 and an advertisement contents providing unit 340. The processor 134 may be configured to execute an instruction based on codes of the O/S and one or more program codes, which are included in the memory 132. At this time, the internal components within the processor 134, that is, the data collection unit 310, the data processing unit 320, the advertisement contents selection unit 330 and the advertisement contents providing unit 340 may be considered as different functions which are performed by the processor 134 according to a control command provided by a program code stored in the server 130.

For example, the data collection unit 310 may indicate a function of collecting execution history information of applications, transmitted from the respective mobile terminals 110, and the data processing unit 320 may indicate a function of processing the tendencies of users based on the execution history information of the respective mobile terminals 110. Furthermore, the advertisement contents selection unit 330 may indicate a function of selecting target advertisement contents suitable for a user's field of interest among the advertisement contents stored/retained in the database 133 in response to the analysis result of the data processing unit 320, and the advertisement contents providing unit 340 may indicate a function of transmitting the selected target advertisement contents to the mobile terminal 110.

The data processing unit 320 may classify the personal characteristics of each user based on the tendency of the user, and set the user to a target customer for each field, into which fashion, shopping, books, travel, food life, home appliance/furniture, or regional characteristics is reflected, in response to the classified personal characteristics of the user.

When a user is included in target customers of a specific field according to user behavior information which is analyzed based on the advertisement identifiers, the advertisement contents selection unit 330 may select target advertisement contents suitable for the user's field of interest among the advertisement contents stored/retained in the database 133.

By analyzing the execution history information of the applications for each of the mobile terminals 110, the processor 134 may determine the tendency of applications which have been recently used by the corresponding user, which makes it possible to decide the tendency of the user more accurately. For example, when the recent usage frequency of shopping applications is high, it may indicate that the user has a high purchasing need, and when the recent usage frequency of health-related applications is high, it may indicate that the user has a lot of concern for health. The processor 134 may decide a matter of recent interest of each user based on the analysis result of the execution history information of the applications for each of the mobile terminals, and select target advertisement contents related to the matter of interest.

Then, the advertisement contents providing unit 340 may transmit the selected target advertisement contents to the mobile terminal 110, thereby providing the optimized target advertisement to the user.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A mobile terminal comprising:
 a memory having a plurality of applications stored therein;
 an application manager configured to receive application information corresponding to the respective applications, and generate status information of the applications, corresponding to the application information; and
 a controller configured to determine execution history information of the applications through the status information provided from the application manager, and
 a communicator configured to communicate with an external server through a network under control of the controller,
 wherein the application manager comprises:
 an application information collector configured to collect current cache data sizes of the respective applications at preset time intervals in the memory of the mobile terminal, wherein the current cache data sizes indicating sizes of the memory being physically and currently used by the respective applications; and
 a comparator configured to generate the status information of the applications by comparing the current cache data sizes of the respective applications collected by the application information collector to reference values corresponding to the respective applications, wherein:
 the reference values corresponding to the respective applications indicate previous cache data sizes of the respective applications before the current cache data sizes of the respective applications are collected by the application information collector, the previous cache data sizes indicating sizes of the memory being physically and previously used by the respective applications, and
 after the comparator compares the current cache data sizes of the respective applications to the reference values corresponding to the respective applications, the current cache data sizes of the respective applications in the memory of the mobile terminal, collected by the application information collector, are updated into the previous cache data sizes of the respective applications in the memory of the mobile terminal such that the reference values corresponding to the respective applications are reset into the current cache data sizes of the respective applications and stored in the memory of the mobile terminal, and
 wherein the controller is configured to transmit the status information or the execution history information of the applications to the external server through the communicator to receive a content of a target advertisement based on the status information or the execution history information of the application and associated with at least one of the applications executed recently in a first time.

2. The mobile terminal of claim 1, further comprising a display configured to display a result to a user, the result being sensed by the controller based on the status information or the execution history information of the applications.

3. The mobile terminal of claim 1, further comprising an audio generator configured to output a result sensed by the controller based on the status information or the execution history information of the applications as an audio signal to a user.

4. An application management method for managing an application of a mobile terminal, comprising:
 receiving application information corresponding to a plurality of applications stored in a memory;
 generating status information corresponding to the respective applications by comparing the received application information to reference values of the respective applications;
 determining executions history information of the respective applications based on the status information;
 storing the execution history information of the respective applications and the status information corresponding to the respective applications, and
 transmitting the status information or the execution history information of the applications to an external server through a network to receive a content of a target advertisement based on the status information or the execution history information of the application and associated with at least one of the applications executed recently in a first time,
 wherein the status information corresponding to the respective applications comprises current cache data sizes of the respective applications in the memory of the mobile terminal, the current cache data sizes indicating sizes of the memory being physically and currently used by the respective applications, and wherein:
 the reference values of the respective applications indicate previous cache data sizes of the respective applications before receiving the current cache data sizes of the respective applications, the previous cache data sizes indicating sizes of the memory being physically and previously used by the respective applications, and
 after comparing the current cache data sizes of the respective applications to the reference values of the respective applications, the current cache data sizes of the respective applications in the memory of the mobile terminal are updated into the previous cache data sizes of the respective applications in the memory of the mobile terminal such that the reference values corresponding to the respective applications are reset into the current cache data sizes of the respective applications and stored in the memory of the mobile terminal.

5. The application management method of claim 4, further comprising displaying a sensing result to a user, the sensing result being generated based on the status information or the execution history information of the applications.

6. The application management method of claim 4, further comprising outputting a sensing result as an audio signal to a user, the sensing result being generated based on the status information or the execution history information of the applications.

\* \* \* \* \*